June 27, 1967     L. J. LA BARRE     3,327,542

MECHANICAL APPARATUS

Filed July 1, 1965

INVENTOR
LAWRENCE J. LA BARRE

BY    Q.C. Smith

ATTORNEY

United States Patent Office 3,327,542
Patented June 27, 1967

3,327,542
MECHANICAL APPARATUS
Lawrence J. La Barre, Mountain View, Calif., assignor to Hewlett-Packard Company, Palo Alto, Calif., a corporation of California
Filed July 1, 1965, Ser. No. 468,685
4 Claims. (Cl. 74—10.2)

This invention relates to a detent mechanism having an adjustable stop.

Commonly, detent mechanisms include a single stop such that the notched detent disk must be rotated through an arc of nearly three hundred and sixty degrees between stops. In many applications not all the detent disk positions corresponding to such a full arc are necessary and, therefore, a lesser arc of detent positions between stops would be desirable.

Accordingly, it is the principal object of this invention to provide an adjustable second stop for making the arc of detent positions between stops adjustable.

Figure 1:
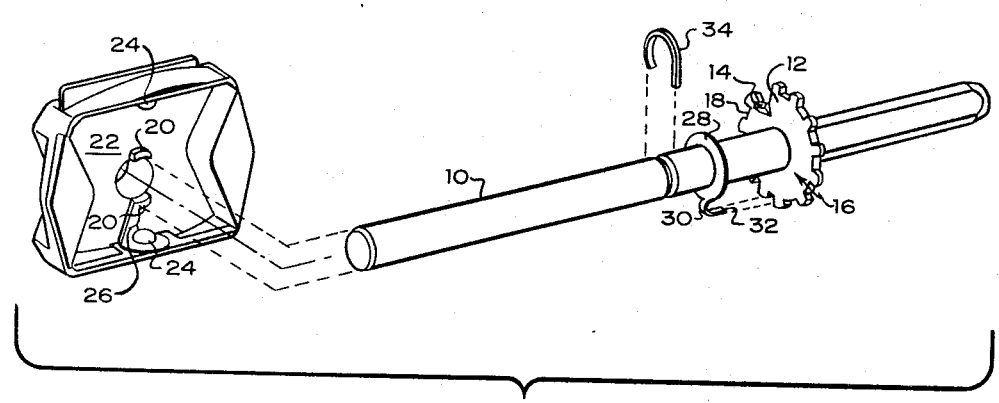
Figure 2:
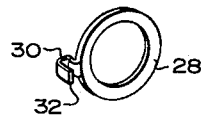

Other and incidental objects of this invention will become apparent from a reading of this specification and an inspection of the accompanying drawing in which:

FIGURE 1 is an exploded view of a detent mechanism according to this invention; and FIGURE 2 is a detailed view of the adjustable stop of the detent mechanism of FIGURE 1.

Referring now to FIGURE 1, there is shown a shaft 10 having a notched detent disk 12 fixedly mounted thereon for rotation therewith. This detent disk 12 includes a finger-like portion 14 protruding beyond the plane of one surface 16 thereof at one of the notches 18 to form a first stop for the detent mechanism. When the detent mechanism is assembled, the surface 16 of the detent disk rides on the posts 20 embedded in the housing 22. Balls 24 which are rotatably supported by the housing 22 ride on the periphery of the detent disk 12. Each engagement of the balls 24 with a pair of diametrically opposed notches 18 corresponds to one position of the detent mechanism. A ridge 26 extends from one of the posts 20 to the adjacent wall of the housnig 22 for engaging the first stop.

If the detent mechanism included only the first stop, the detent disk 12 would have to be rotated through nearly three hundred and sixty degrees to traverse the distance between stops. However, the detent mechanism of this invention also includes an adjustable second stop shown in detail in FIGURE 2 and comprising a generally ring-shaped element 28 concentrically mounted on the shaft 10. This ring-shaped element 28 abuts upon the surface 16 of the detent disk 12 and includes a finger-like portion 30 extending away from the periphery thereof. This finger-like portion 30 is arched so as to extend beyond the plane of the surface 16 of detent disk 12 for engaging the ridge 26. The tip 32 of the finger-like portion 30 fits tightly into a selected one of the notches 18, all of which have substantially the same dimensions.

Simply, by appropriately positioning the adjustable second stop any desired arc and, hence, the desired number of detent disk positions between stops may be provided with the detent mechanism of this invention. Furthermore, the position of the adjustable second stop may be changed at any time by removing the lock washer 34 which holds the shaft 10 and housing 22 in the operative position, retracting the shaft slighlty, and resetting the tip 32 of the finger-like portion 30 in the appropriate notch 18.

I claim:
1. A detent mechanism comprising:
a shaft having a detent disk fixedly mounted thereon,
said detent disk having a plurality of notches spaced around the periphery thereof and having a finger-like portion extending beyond the plane of one surface thereof at one of said notches to form a first stop for said detent mechanism,
a generally ring-shaped element concentrically mounted on said shaft and abutting upon said one surface,
said ring-shaped element including a finger-like portion extending away from the periphery thereof, and
said last-mentioned finger-like portion being arched with the tip thereof fitting into another of the notches of said disk to provide an adjustable second stop extending beyond the plane of said one surface for the detent mechanism.

2. A detent mechanism comprising:
a shaft having a detent disk mounted thereon,
said detent disk having a plurality of notches spaced around the periphery thereof,
a generally ring-shaped element concentrically mounted on said shaft adjacent to one surface of said detent disk,
said ring-shaped element including a finger-like element extending away from the periphery thereof, and
said finger-like element having a raised portion extending beyond the plane of said one surface and a tip fitting into one of the notches of said detent disk to provide an adjustable stop for the detent mechanism.

3. A detent mechanism as in claim 2 including means for engaging the raised portion of said adjustable stop to limit rotation of said detent disk to a selected arc in one direction, said means being supported in the path described by said adjustable stop when said detent disk is rotated.

4. A detent mechanism as in claim 3 wherein:
said detent disk includes another stop extending beyond the plane of said one surface; and
said means for engaging the raised portion of said adjustable stop is also operable for engaging said other stop to limit rotation of said detent disk to a selected arc in the other direction.

No references cited.

MILTON KAUFMAN, *Primary Examiner.*